May 31, 1927.

M. R. BUTLER 1,630,605

MATERIAL HANDLING EQUIPMENT

Filed April 11, 1925    2 Sheets-Sheet 1

Inventor
Morgan R. Butler
By Ira M. Jones
Attorneys

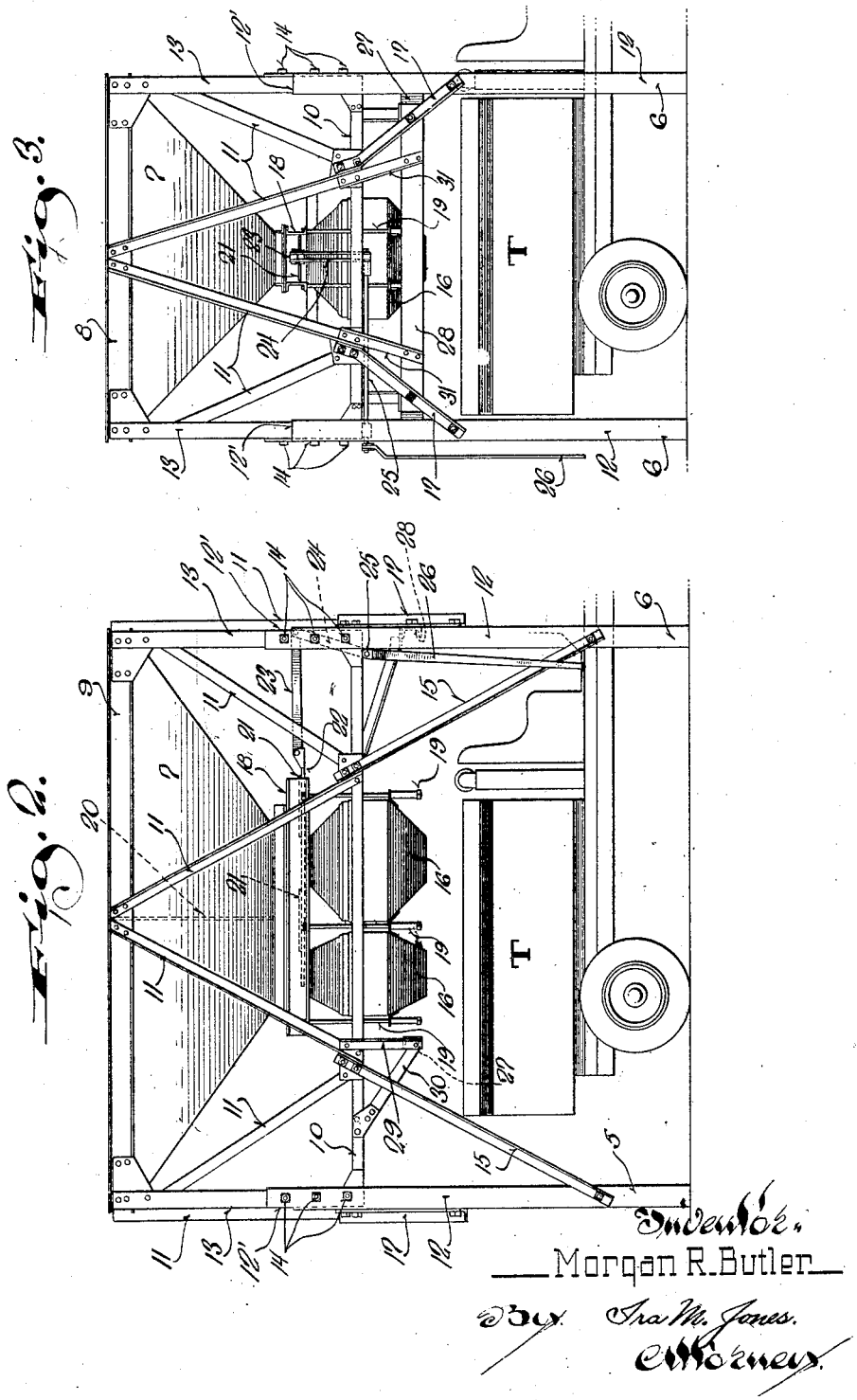

Patented May 31, 1927.

1,630,605

UNITED STATES PATENT OFFICE.

MORGAN R. BUTLER, OF WAUKESHA, WISCONSIN.

MATERIAL-HANDLING EQUIPMENT.

Application filed April 11, 1925. Serial No. 22,343.

The present type of apparatus of this character has provision whereby a motor vehicle, such as a truck or the like, for conveying material from the measuring apparatus to the mixer can pass under the measuring hopper to receive material in but one direction. As a result, when it becomes desirable by reason of a change in the character of the work to have the motor vehicles or trucks approach the measuring apparatus from another angle, it is necessary that the entire apparatus be repositioned and this invention has as one of its objects the provision of an improved supporting structure for material handling apparatus which will permit trucks for receiving the material therefrom to pass therebeneath from all sides.

Another object of this invention resides in the provision of an improved type of apparatus of the character described wherein the gate for controlling the discharge of material from the supply bin or bins may be readily actuated from the ground, the actuating member therefor being positioned adjacent one of the frame standards to thus prevent injury thereto by trucks moving under the apparatus.

A further object of this invention resides in the provision of an improved supporting structure for an apparatus of the character described which will facilitate the transportation of the same without injury thereto.

A still further object of this invention resides in the provision of an improved supporting structure for material measuring apparatus which will be of strong construction and which will not increase the cost of the construction and which will permit the easier operation of the apparatus in that the trucks for receiving the material may approach the same from all sides.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 2 is a side view thereof; and

Figure 3 is an end view thereof turned ninety degrees.

Figure 1:
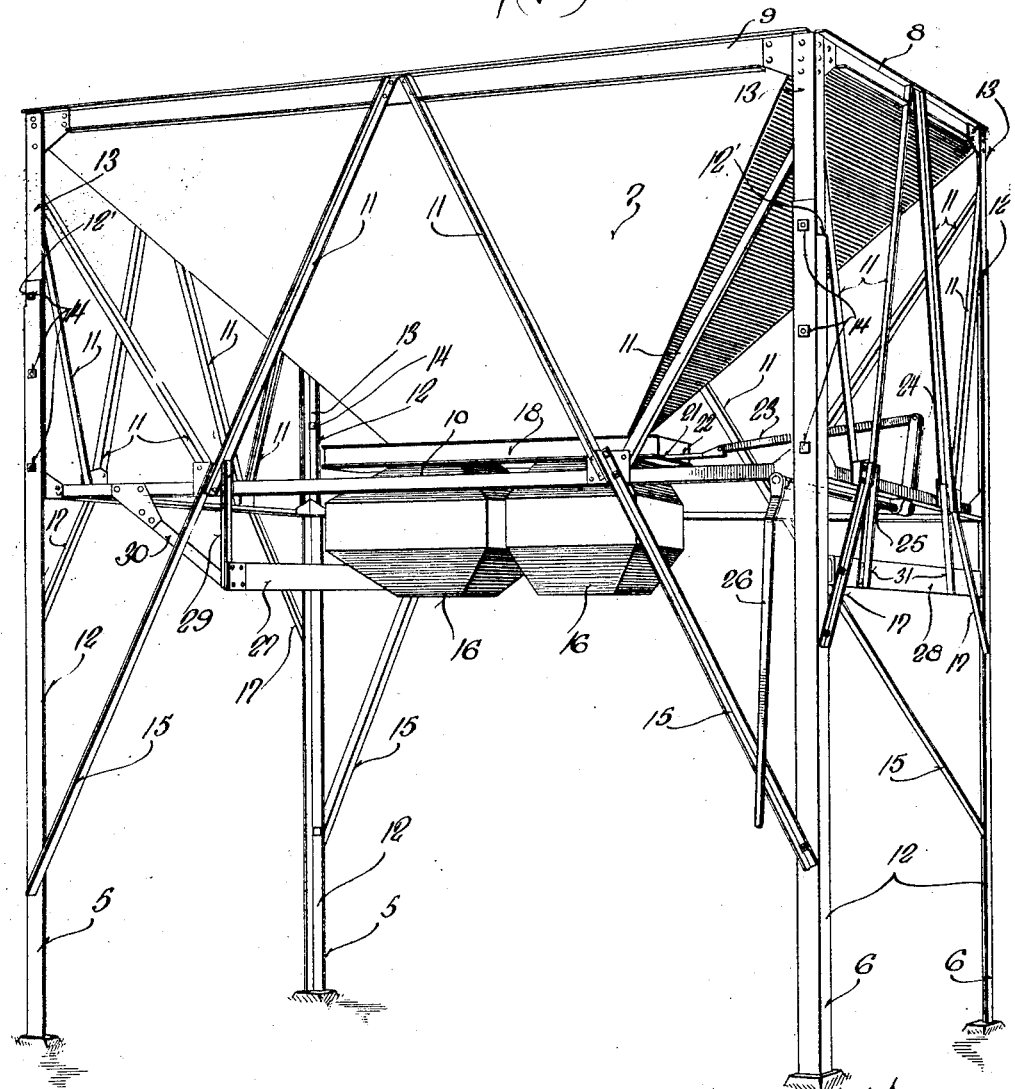
Figure 1 is a perspective view of an improved material handling apparatus embodying my invention.

Referring now more particularly to the accompanying drawings, in which like numerals designate like parts throughout the several views; the numerals 5 and 6 designate two pairs of vertical standards or uprights of a supporting structure for mounting a material supply bin 7. The uprights of each pair are connected at their upper ends by a transverse beam 8 and the opposite uprights are connected by side longitudinal beams 9, the beams 8 and 9 forming an upper rectangular frame of a transverse area approximately equal to that of the upper portion of the bin 7.

An intermediate or lower brace frame 10 including end and side angle members, are connected with the uprights and the upper frame by diagonal cross braces 11. As illustrated in the drawings, each upright is formed in two sections or parts 12 and 13, the sections 13 extending from the lower frame 10 to the upper frame formed by the beams 8 and 9. The lower sections 12 form the supporting legs for the structure and overlap the sections 13 and to which they are preferably removably secured, as at 14.

Each leg section 12 is braced against end strains by diagonal angle beams 15 secured thereto adjacent their lower ends and to the side members of the lower frame 10 at a point to form a substantial continuation of the diagonal braces 11 secured thereto at their lower ends and to the beams 9 at a medial point. This arrangement places the braces 15 to one side to permit the free passage of a truck T beneath the bin and the measuring hoppers 16 carried thereby from either side of the apparatus.

The sections 12 are further braced against side strains by end diagonals 17 which extend from the sections 12 at a medial point to the frame 10 to which they are secured adjacent the lower ends of the diagonals 11 secured thereto and to the end beams 8 at a medial point. The diagonals 17 are so disposed as to permit free passage of a truck between the end standards.

The measuring hoppers 16 may be of any desired type and are supported from the lower discharge end of the bin 7 by a frame 18 and suspension rods 19 extended therefrom. The bin 7 is divided by a partition 20 and the compartments thus formed communicate with their respective discharge hoppers through openings adapted to be controlled by valves or gate members 21.

The gate members 21 are connected with a control rod 22 to one end of which the inner end of a link 23 is pivotally connected, the other end of the link being pivotally connected to a lever 24 fixed to a shaft 25 and journaled transversely to the end member of the intermediate frame 10 adjacent the standard 6, the outer end of the shaft 25 having an actuating lever 26 fixed thereto. The lever 26 is normally positioned in approximate alignment with the adjacent standard and out of the way to prevent injury thereto by the passage of trucks beneath the supply bin and measuring hoppers. As will be readily obvious, rocking of the shaft 25 by the lever 26 effects the opening and closing of the gate members through the lever 24 and link 23.

This arrangement of supporting structure for the supply bin and measuring hoppers permits the passage of a truck thereunder in either of four directions.

When it is desired to transport the bin, the diagonal braces 15 and the sections 12 of the standards or verticals 5 and 6 are removed and the structure positioned on a truck, flat car or other means of transportation, the measuring hoppers 16 being protected against injury and the weight of the device being borne by transverse members 27 and 28 supported from the intermediate or lower frame 10. The transverse member 27 is supported from the side members of the frame 10 adjacent the standards 5 by depending angle irons or suspension members 29 and diagonal braces 30. The transverse member 28 is connected with the end beam of the frame 10 adjacent the standards 6 by depending members 31 and the adjacent diagonals 17.

With this construction it will be evident that the complete unit may be shipped without dismantling with the exception of removing the lever 26, standard sections 12 and the diagonals 15 and 17, the weight being borne by the members 27 and 28.

The sections 12 have the upper end portions of their end flanges cut away, as at 12′, to a point below the top-most bolt 14 so that the leg member may hinge thereon when the braces 15 and 17 and the lower bolts 14 are removed. With this construction, the legs may hinge out and fold into position as the respective sides of the device are raised, thus elminating the necessity of lifting the apparatus as a whole.

What I claim as my invention is:

1. An apparatus for handling material, such as sand, gravel and the like, comprising, in combination, a supply bin, a supporting frame for mounting the supply bin above the ground to permit the passage thereunder to receive material therefrom, said supporting frame including vertical standards spaced apart to permit the passage of the motor vehicle or the like beneath the supply bin between any adjacent standards, and means for controlling the discharge of material from the supply bin and including an actuating lever positioned adjacent one standard.

2. An apparatus for handling material, such as sand, gravel and the like, comprising, in combination, a supply bin, a supporting frame for mounting the supply bin above the ground to permit passage thereunder to receive material therefrom, said supporting frame including vertical standards spaced apart to permit the passage of the motor vehicle or the like beneath the supply bin between any adjacent standards, diagonal braces for the standards, said braces being so positioned as not to interfere with the passage of the motor vehicle or the like between the standards, valve means controlling the discharge of material from the supply bin, and means for actuating the valve means from the ground and including a shaft transversely journaled in the supporting frame with its outer end extended therebeyond adjacent one standard, an actuating lever mounted on the outer end of the shaft and normally positioned out of the way and approximately in line with the adjacent standard and means connecting the inner portion of the shaft with the valve means, whereby movement of the lever actuates the valve means.

3. An apparatus of the character described, comprising a supporting structure including an upper and a lower frame, corner members connecting the frames and medial braces connecting the frames, supporting legs forming continuations of the corner members to support the structure above the ground, a supply bin extending from the upper frame of the supporting structure, and a measuring hopper positioned beneath the supply bin with its lower end disposed adjacent the lower frame of the supporting structure.

4. An apparatus of the character described, comprising a supporting structure including an upper and lower frame, corner members connecting the frames and medial braces connecting the frames, removable supporting legs forming continuations of the corner members to support the structure above the ground, a supply bin extending from the upper frame of the supporting structure, a measuring hopper positioned beneath the supply bin with its lower end disposed adjacent the lower frame of the supporting structure, and rest members extended below the lower frame of the supporting structure to sustain the weight of the apparatus when the supporting legs have been removed.

5. An apparatus of the character described, comprising a supporting structure including an upper and a lower frame, corner members connecting the frames and medial braces connecting the frames, supporting legs forming continuations of the corner members to support the structure above the ground, a supply bin extending from the upper frame of the supporting structure, and a measuring hopper positioned beneath the supply bin with its lower end disposed adjacent the lower frame of the supporting structure, said supporting legs being foldable with relation to the corner members, whereby one corner of the apparatus may be raised at a time and the adjacent leg swung to operative position.

In testimony whereof I affix my signature.

MORGAN R. BUTLER.